(12) United States Patent
Quell

(10) Patent No.: US 7,767,622 B2
(45) Date of Patent: Aug. 3, 2010

(54) CATALYTIC CONVERTER WITH IMPROVED START-UP BEHAVIOUR

(75) Inventor: Juergen Quell, Hochdorf-Assenheim (DE)

(73) Assignee: Umicore AG & Co. KG, Hanau-Wolfgang (DE)

( * ) Notice: Subject to any disclaimer, the term of this patent is extended or adjusted under 35 U.S.C. 154(b) by 0 days.

(21) Appl. No.: 12/278,027

(22) PCT Filed: Feb. 7, 2007

(86) PCT No.: PCT/EP2007/001023

§ 371 (c)(1),
(2), (4) Date: Dec. 18, 2008

(87) PCT Pub. No.: WO2007/090618

PCT Pub. Date: Aug. 16, 2007

(65) Prior Publication Data

US 2009/0214406 A1    Aug. 27, 2009

(30) Foreign Application Priority Data

Feb. 7, 2006   (DE) ..................... 10 2006 005 788

(51) Int. Cl.
*B01J 21/04*   (2006.01)
(52) U.S. Cl. ................. 502/439; 502/427; 422/171; 422/180; 422/211; 422/222; 422/175
(58) Field of Classification Search .............. None
See application file for complete search history.

(56) References Cited

U.S. PATENT DOCUMENTS 5,648,050 A    7/1997   Matsumoto (Continued)

FOREIGN PATENT DOCUMENTS

EP        0 705 962        4/1996

(Continued)

OTHER PUBLICATIONS

Notification of transmittal of translation of the International Preliminary Report on Patentability (Chapter I or Chapter II of the Patent Cooperation Treaty)PCT/EP2007/001023.

(Continued)

*Primary Examiner*—Melvin C Mayes
*Assistant Examiner*—Smita Patel
(74) *Attorney, Agent, or Firm*—Kalow & Springut LLP; William D. Schmidt

(57) ABSTRACT

In automotive exhaust gas catalysts with a metallic honeycomb composed of corrugated and smooth sheet layers, it is known that the heat capacity and thermal conductivity of the honeycomb can be reduced by perforations in the sheet layers. As a result, the honeycomb heats up more rapidly and the catalytic coating applied on the honeycomb reaches its operating temperature more rapidly. A disadvantage here is the reduction in the support surface area by the perforations in the sheet layers. According to the invention, suitable adjustment of the properties of the coating suspension used for the catalytic coating and of the dimensions of the holes relative to one another allows the holes to be filled permanently with catalyst material. The resulting catalyst has, at the same coating concentration as a catalyst with unperforated sheet layers, a significantly reduced heat capacity and thermal conductivity.

12 Claims, 4 Drawing Sheets

Holes of diameter 0.8 mm

Hole area: 50%

U.S. PATENT DOCUMENTS

| | | |
|---|---|---|
| 5,821,194 A | 10/1998 | In |
| 2002/0039549 A1* | 4/2002 | Lindner et al. ........... 423/213.5 |
| 2003/0173211 A1* | 9/2003 | Gestermann et al. ........ 204/265 |
| 2005/0170957 A1* | 8/2005 | Maus et al. ................. 502/439 |

FOREIGN PATENT DOCUMENTS

| | | |
|---|---|---|
| JP | 05309277 | 11/1993 |
| WO | 2004/022937 | 3/2004 |

OTHER PUBLICATIONS

International Search Report (PCT/EP2007/001023).

Written Opinion (PCT/EP2007/001023).

* cited by examiner

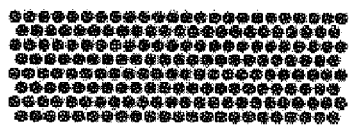
Figure 1 Holes of diameter 0.8 mm
Hole area: 50%
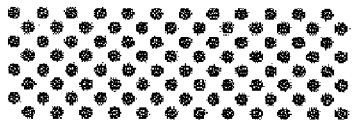
Figure 2 Holes of diameter 0.8 mm
Hole area: 25%
Figure 3 Elongated 0.8 × 1.6 mm holes
Hole area: 65%
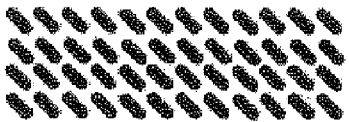
Figure 4 Elongated 0.8 × 2.2 mm holes
Hole area: 40%

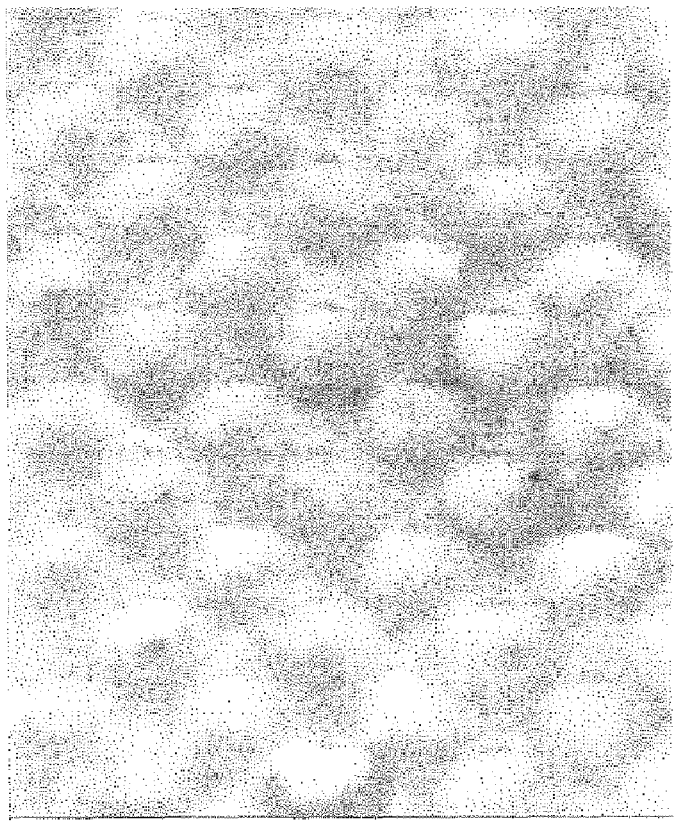
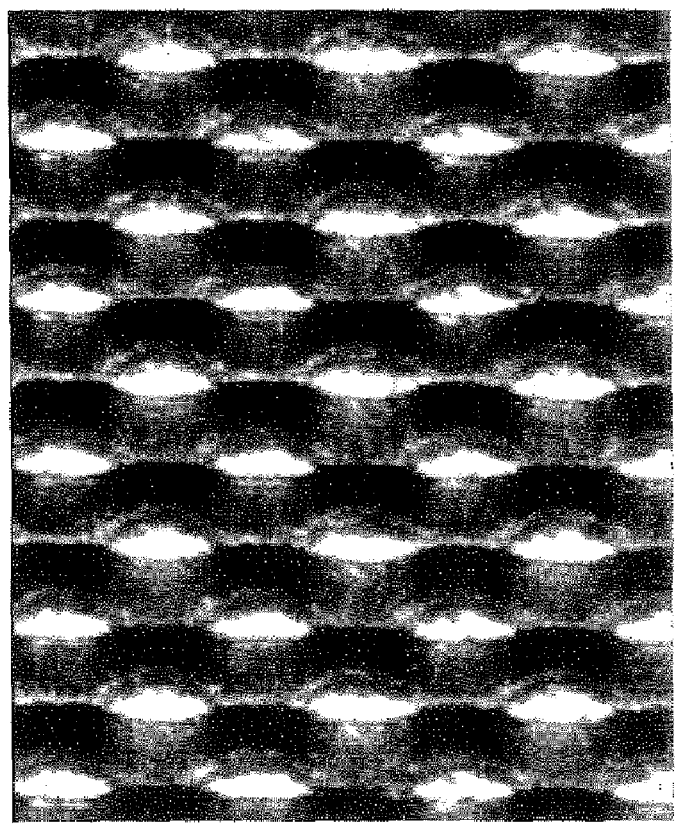
Figure 6

CATALYTIC CONVERTER WITH IMPROVED START-UP BEHAVIOUR

The present invention addresses metallic honeycombs as supports for a coating of catalyst material for the exhaust gas cleaning of internal combustion engines.

BACKGROUND OF THE INVENTION

What is desired from the honeycombs is firstly a large geometric surface area to accommodate the coating and secondly a low heat capacity in order that the honeycomb warms up rapidly to the operating temperature of the catalyst. In addition, a sufficient mechanical stability is required from the honeycombs in order to withstand the mechanical stresses through the pulsating gas flow and the vibrations of engine and vehicle. Moreover, the material of the honeycomb has to be resistant to the corrosive exhaust gas atmosphere at high temperatures.

The catalytic coating of a finished catalyst consists of finely divided thermally stable metal oxides on whose surface are deposited catalytically active platinum group metals. Suitable metal oxides are, for example, aluminum oxide, titanium oxide, silicon oxide, cerium oxide, zirconium oxide, zeolites and mixtures or mixed oxides thereof, and stabilizers such as lanthanum oxide and barium oxide. To apply these materials to the honeycomb, the pulverulent materials are, for example, suspended in water. Subsequently, this coating suspension is deposited onto the honeycombs by known processes, dried and consolidated by calcining.

The honeycombs may be of different structure. Even at a very early stage, spiral-wound honeycombs were used. They consist of one smooth and one corrugated sheet layer which are placed one on top of another and then wound up in a spiral and inserted into an outer tube. The two sheet layers form channels through which the exhaust gas can flow and enter into intensive contact with the catalytic coating.

In another design, the honeycomb is formed from a multitude of smooth and corrugated sheet layers, or differently corrugated sheet layers, arranged in alternation, in which case the sheet layers first form one or more stacks which are intertwined with one another. The ends of the sheet layers are on the outside and can be bonded with an outer tube. This forms many connections between sheet layers and outer tube, which increase the mechanical strength of the honeycomb.

The material used for the sheet layers are preferably aluminum-containing steel alloys, which are marketed, for example, under the trade name FeCrAlloy®. This is an iron-chromium-aluminum alloy. The thickness of the sheet layers is usually between 20 and 80 µm, preferably 50 µm.

It has been known for some time that the sheet layers can be provided with perforations and corrugations in order to influence the flow within the channels and/or to achieve transverse mixing between the individual flow channels. It is likewise known that slotted sheets can be used for the construction of metallic honeycombs. U.S. Pat. No. 5,599,509 proposes, for example, equipping the sheets with slots transverse to the flow direction of the exhaust gas in the entrance region of the honeycomb in order to reduce the heat capacity of the honeycomb in this region in a controlled manner.

As a result of the reduced thermal conductivity and heat capacity in the front part, the catalyst coating applied reaches its lightoff temperature more rapidly and hence also achieves a better conversion, for example for carbon monoxide and hydrocarbons. However, the improvement in the conversion depends significantly upon the percentage slot area of the sheet layers. The conversion is improved only within a range of slot areas between 20 and 50%. Above 50%, the hydrocarbon conversion decreases again because the catalyst material available decreases with increasing slot area and equal thickness of the catalyst layer. The improvements in the conversion are therefore observed only in the warm up phase. After the warmup phase, the reduced amount of catalyst material leads to a worsened conversion of the harmful substances in the exhaust gas. Moreover, such a catalyst, owing to the small amount of catalyst material, has a low aging resistance. Furthermore, the perforation in the sheet layers increases the back pressure of the catalyst, since turbulence forms at the holes. If the intention were to apply the same mass of catalyst material as in the case of an unperforated support with the same geometry to such a catalyst support, the layer thickness of the catalyst layer and hence likewise the back pressure of the catalyst would inevitably increase.

DE 103 14 085 A1 likewise describes metallic honeycombs composed of at least partly perforated sheet layers. The aim of the perforations is to enable transverse mixing of the exhaust gas streams of different flow channels. In the coating, it is therefore ensured that the holes are not closed by the coating suspension. For this reason, the honeycombs are coated in a vibration unit which generates a relative motion between the coating suspension and the support body and hence prevents closure of the holes.

U.S. Pat. No. 5,821,194 describes a metallic honeycomb composed of smooth and corrugated sheet layers. To improve the adhesion of a pre-coating material, the sheet layers are equipped with a multitude of holes, into which the pre-coating composition penetrates in the course of coating and forms a mechanical anchor between sheet layers and coating material. For this purpose, the diameter of the holes is about half the size of the thickness of the sheet layers and is thus from 25 to 35 µm. The holes are arranged at a distance of about 1 mm from one another.

SUMMARY OF THE INVENTION

The present invention shall avoid the disadvantages known from the prior art of perforated sheet layers. It is an object of the invention to compensate for the loss of support surface through the hole surface of the sheet layers by means of suitable measures.

This object is achieved by a catalyst for the cleaning of the exhaust gases of internal combustion engines, which comprises a honeycomb composed of smooth and corrugated metal sheets with an entrance end face and an exit end face for the exhaust gases, the metal sheets being provided with holes to reduce their heat capacity and a catalyst material having been applied to the metal sheets. The catalyst is characterized in that the holes and/or slots of the metal sheets are filled substantially with catalyst material and the hole area of all holes together is 5 to 80% of the area of the metal sheets.

DETAILED DESCRIPTION OF THE PREFERRED EMBODIMENTS

In contrast to U.S. Pat. No. 5,599,509, the holes and slots in the sheet layers according to the present invention are filled with catalyst material. The filling with catalyst material or with a pre-coating is effected directly in the coating operation; no additional working steps are required. When the same amount of catalyst material is used as finds use in the case of supports of the same geometry without perforations, the heat capacity is reduced by the proportion of the perforations in the sheet layers. The physical data in Table 1 can serve to estimate these effects:

TABLE 1

Physical data of FeCrAlloy and catalyst layer composed of aluminum oxide in comparison

| Property | FeCrAlloy | Catalyst layer |
|---|---|---|
| Density g/dm$^3$ | 7.28 | 1.2-1.6 |
| Spec. heat capacity J/(kg · K) | 480 | 750-950 |
| Thermal conductivity W/(m · K) | 16 | 1.4 |

The advantage according to the invention is that the perforations of the sheet layers do not lead to a reduction in the amount of catalyst material. As a consequence, the inventive catalyst, as a result of the reduced heat capacity of the support, reaches its lightoff temperature very rapidly and then displays the full activity of the unreduced amount of catalyst coating. Furthermore, the inventive catalyst, owing to the higher loading concentration with catalyst material, has an improved aging stability over conventional perforated catalysts.

Of course, it would also be possible to apply the same coating concentration in accordance with the prior art without closing the holes on the honeycomb. However, the coating thickness would then inevitably be significantly greater and would thus lead to a higher flow resistance of the catalyst.

To prepare the inventive catalyst, the properties of the coating suspension have to be adjusted to the hole dimensions in order to ensure complete filling of substantially all holes with catalyst material. Low viscosity coating suspensions can close only small holes; viscous coating suspensions, in contrast, cover even relatively large holes. The person skilled in the art can easily determine the optimal conditions by a few preliminary experiments.

The shape of the holes need not be circular. The hole area coverable by the coating suspension is dependent upon the type of holes and the properties of the coating suspension. Generally, the area of the individual holes may be from 0.1 to 25 mm$^2$. In the case of circular holes, a hole area of from 0.1 up to 1 mm$^2$ has been found to be useful; in the case of elongated holes, the hole area, in contrast, may be selected between 0.25 and 25 mm$^2$, preferably between 0.25 and 5 mm$^2$. Within the context of the restrictions mentioned, the holes can therefore be round, elliptical, oval, square, rectangular, slot-shaped or polygonal.

When the above requirements with regard to the properties of the coating suspension and the hole dimensions are observed, the known coating processes by dipping, pouring-over, sucking-in or pumping-in may be employed for the actual coating operation. In the removal of excess coating suspension by blowing with compressed air, it must, though, be ensured that the holes closed with the moist catalyst material are not opened again in this operation.

After the coating suspension has been dried, it is calcined at from about 300 to 600° C. Thereafter, the holes are closed with a robust layer of the catalyst material which withstands the harsh operating conditions in the exhaust gas line of an internal combustion engine.

In this way, as in the case of unperforated honeycombs, according to the coating thickness desired, it is possible to achieve coating concentrations between 50 and 400 grams per liter of volume of the honeycomb. If the intention were to apply the same coating concentration without closing the holes, the coating thickness on the sheets would have to be increased correspondingly.

For the production of the honeycomb, preference is given to using all sheet layers, both the smooth and the corrugated sheet layers, in perforated form. The advantages of the invention are, though—even if in attenuated form—also realized when, for example, only the smooth or only the corrugated sheet layers are used in perforated form.

Furthermore, it may be appropriate to restrict the perforations only to a particular region of the honeycomb. It is advantageous, for example, to position the perforations only in the inflow region of the honeycomb.

The area of all holes together relative to the total area A of the sheet layers in the perforated region determines the achievable reduction in the heat capacity. According to the invention, the area of all holes relative to the total area in the perforated region of the honeycomb is between 5 and 80%. Above 80%, the strength of the honeycomb is too greatly impaired by the perforations. The hole fraction is preferably between 5 and 65%, in particular between 20 and 65%.

In addition to the perforations, the sheet layers may also have corrugations and embossments when the exhaust gas stream is to be swirled to improve the contact with the catalytic coating.

It has been found to be particularly advantageous to use so-called expanded metals for the sheet layers to construct the honeycomb. An expanded metal refers to a metal sheet with orifices, known as meshes, which are obtained by offset cuts with simultaneous stretching at right angles to the cuts without material loss. The expanded metal has a lattice structure with rhombus-shaped or slot-shaped meshes. The meshes consist of strands and the orifice enclosed by them. The crossing points of the strands are referred to as node points. The size of a mesh is given by mesh length and mesh width. The mesh length is the distance from node point center to node point center in the direction of the long diagonal. The same applies to the mesh width. A further characteristic of expanded metals is the width of their strands.

In the production of expanded metal from a metal sheet, the width of the metal sheet at right angles to the stretching direction is maintained, since the strands are elongated in the punching step because the as yet unpunched sheet resists deformation before the punching step. This forms a corrugated, plastically structured surface of the expanded metal. When a smooth surface is desired, the expanded metal can be rolled flat after the stretching. An expanded metal can be produced with a free cross-sectional area between 4 and about 90%.

For the inventive catalyst, the smooth or corrugated metal sheets or both sheet types may consist of an expanded metal. The mesh length is preferably between 0.5 and 5 mm with stretching between 5 and 80%, preferably between 10 and 50%. Good results are achieved with an expanded metal with stretching of 30%. Stretching of 30% means that the expanded metal, after production, has 1.3 times the length of the starting sheet. Such a sheet thus has a free hole area of about 23% and a mass reduced by this percentage compared to a conventional sheet of the same length.

The corrugated surface of the expanded metal has an advantageous effect on the catalytic action of the finished catalyst, since it swirls the exhaust gas within the flow channels of the catalyst and hence improves the contact with the catalyst coating. However, it increases the exhaust gas back pressure. When this is not desired, the expanded metals can be flattened by rolling before the catalyst body is formed.

The inventive catalysts are used for cleaning the exhaust gas of internal combustion engines. The catalytic coating may be adjusted to the specific requirements of the exhaust gas composition. The coating may comprise an oxidation catalyst, three-way catalyst, nitrogen oxide storage catalyst or SCR catalyst. The inventive catalyst can be used in motor vehicles with gasoline or diesel engines, both as a starting catalyst close to the engine or as an underfloor catalyst. The catalyst is particularly advantageous for cleaning the exhaust gas of motorized bicycles and water vehicles.

BRIEF DESCRIPTION OF THE FIGURES

FIGS. 1 to 7 serve to illustrate the invention:

FIGS. 1 to 4: illustrate examples of perforated sheet layers with different hole shapes and hole proportions;

FIG. 5: illustrate example of the improved lightoff of the catalyst;

FIG. 6: illustrate photographs of an expanded metal with a stretching of 30% used to form a honeycomb
  a) in the uncoated state
  b) after catalytic coating; and FIG. 7: illustrate comparative measurement of the exhaust gas emission in the European motorcycle test cycle with a conventional honeycomb composed of unperforated sheet layers and an inventive honeycomb with sheet layers manufactured from an expanded metal.

FIGS. 1 to 4 show a few examples of possible perforations of the sheet layers in a scale diagram with twofold magnification.

FIGS. 1 and 2 show perforations composed of circular holes with a diameter of 0.8 mm. The perforations of FIGS. 1 and 2 differ by the distance of the holes from one another and the percentage hole area which is different as a result. According to FIG. 1, the hole area is 50% of the perforated sheet region, while the hole area is only 25% according to the perforation of FIG. 2.

FIGS. 3 and 4 show perforations with elongated holes of different size and percentage hole area.

Simulation Calculations

To demonstrate the advantages of the inventive catalyst, simulation calculations were undertaken. As the basis for the simulations, the exhaust gas values, i.e. harmful substance concentrations and exhaust gas temperature, of a motorcycle with a 1200 $cm^3$ four-stroke engine were measured in the EU3 test cycle as a function of test time.

For the calculation of the harmful substance conversion, two metal honeycombs with a cell density of 360 $cm^{-2}$, a diameter of 90 mm and a length of 74.5 mm were assumed. The metal sheets consisting of FeCrAlloy had a thickness of 50 µm. For a comparative calculation, it was assumed that the honeycomb is constructed from unperforated metal sheets, while, for the example calculation, it was assumed that the honeycomb has perforated metal sheets with a hole area of 50%. The catalyst coating specified was a three-way catalyst with platinum, palladium and rhodium with a noble metal concentration of 1.48 g/l of honeycomb volume, equal in both cases.

Figure 5:
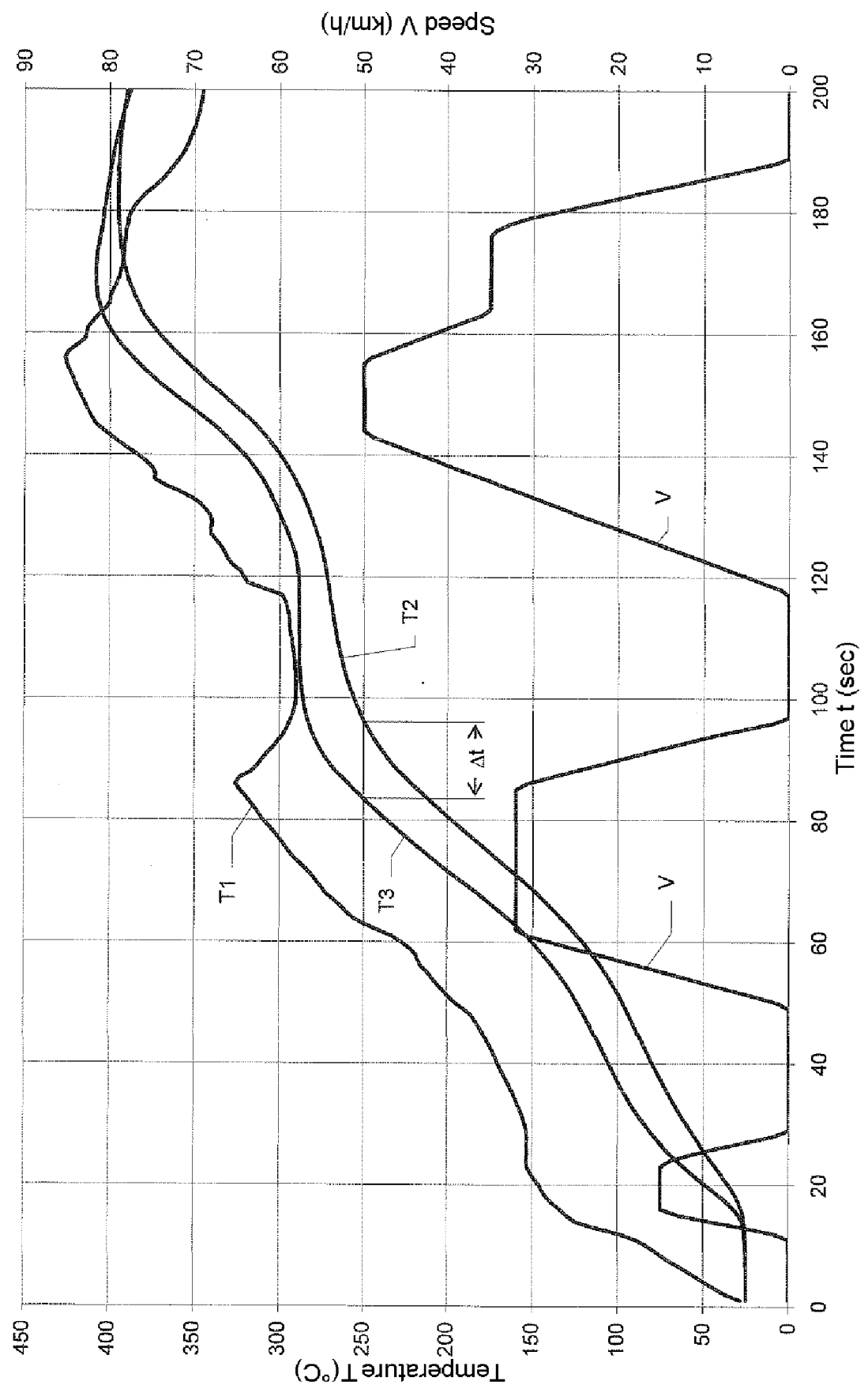

The results of the measurements and calculations are shown in FIG. 5 for the first 200 seconds of the EU3 cycle. "V" denotes the speed profile of the motorcycle according to the test cycle. T1 is the measured temperature profile of the exhaust gas before entry into the catalyst.

Curve T2 in FIG. 5 shows the calculated temperature profile behind the unperforated comparative catalyst, while curve T3 shows the temperature profile behind the perforated example catalyst. It can be seen clearly that, owing to the perforation of the example catalyst, it heats significantly more rapidly. Thus, the perforated catalyst reaches a temperature of 250° C. at Δt=13 s earlier than the unperforated comparative catalyst.

Example 1

Comparative Catalyst (Catalyst A)

A cylindrical metal honeycomb composed of unperforated metal foils of 0.05 mm thickness, a diameter of 90 mm, a length of 74.5 mm and a cell density of 200 $cm^{-2}$ was coated with a conventional three-way catalyst comprising platinum, palladium and rhodium with a noble metal concentration of 1.55 g/l of honeycomb volume.

Example 2

Inventive Catalyst (Catalyst B)

For comparison of the catalytic properties, a further supported metal catalyst with the same dimensions, foil thicknesses and the same cell density as the comparative catalyst was produced. Instead of unperforated metal foils, however, an expanded metal with a stretching of 30% and a mesh length of 0.6, a mesh width of 0.5 and a strand width of 0.18 mm was used. The metal support was coated with the same three-way catalyst in the same concentration as the comparative catalyst.

FIG. 6 a) shows a photograph of the structure of the expanded metal used prior to catalytic coating. FIG. 6 b) shows a corresponding photograph after catalytic coating. It can be seen clearly that the mesh orifices of the expanded metal have been filled completely with catalyst material. The catalyst material adhered in an outstanding manner on the expanded metal and showed no detachment even in the case of blowing with compressed air and knocking.

Back Pressure Measurements

The back pressure of the two supported metal catalysts was determined prior and after catalytic coating with a mass flow rate of 300 $m^3$ (STP)/h ($m^3$ (STP)=standard $m^3$). The results are reproduced in Table 2 below.

TABLE 2

Results of the back pressure measurements

| Catalyst | Back pressure in mbar at 300 $m^3$ (STP)/h | | |
|---|---|---|---|
| | Before coating | After coating | Rise [%] |
| A | 5.9 | 9.4 | 58 |
| B | 8.2 | 10.1 | 22 |

Owing to its three-dimensionally structured surface, the inventive catalyst support B without coating exhibits a significantly higher back pressure than the metal support comprising the unperforated metal foils. After the catalyst coating has been applied, the back pressure of the comparative catalyst increases by 58% from 5.9 to 9.4 mbar. In the case of the inventive catalyst support composed of expanded metal foils, the back pressure after the coating increases only by 22% from 8.2 to 10.1 mbar. The surprising result is found here that by filling of the meshes of the expanded metal with catalyst material the back pressure difference becomes negligible between the two catalysts compared to the back pressure increase between uncoated and coated catalyst support.

Measurement of the Exhaust Gas Emissions in the European Motorcycle Test Cycle

Figure 7:
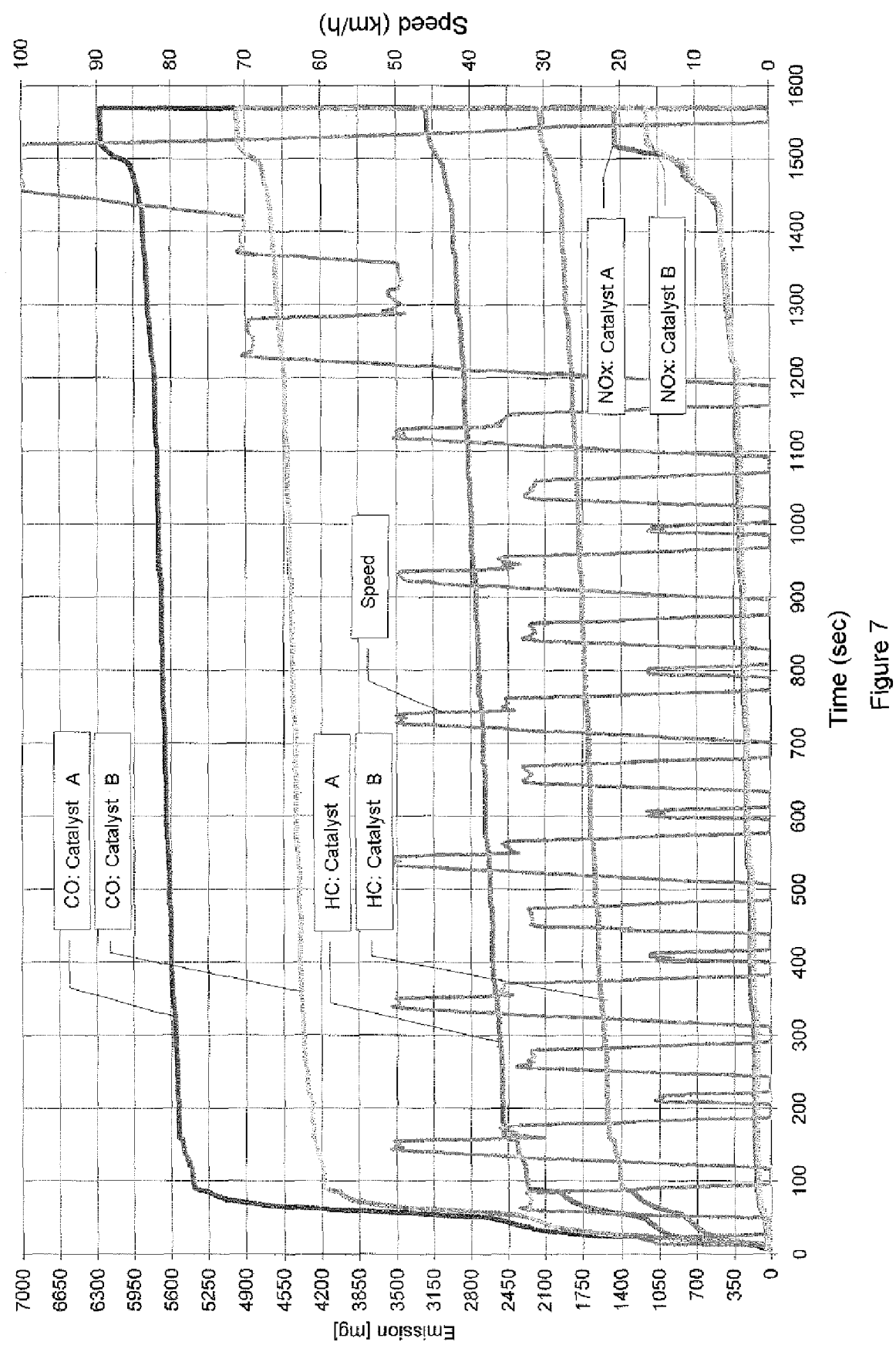

Catalysts A and B were analyzed on a motorcycle with regard to their exhaust gas emissions in the European motorcycle test cycle. FIG. 7 shows the measurements of the CO, HC and NOx emissions of the two catalysts accumulated during the test as a function of driving time. FIG. 7 also shows the speed at which the motorbike traveled. The emission curves of the inventive catalyst B for carbon monoxide and hydrocarbons are significantly below the curves for comparative catalyst A. The difference in the emission between the two catalysts is attributable to the cold-start phase over the first 100 seconds and the reason for it is the shorter lightoff time of the inventive catalyst owing to its lower thermal mass. After the cold-start phase, the two catalysts convert the harmful substances equally well, since they are coated with the same amount of catalyst material. As a consequence, the emission curves run parallel to one another after the cold-start phase.

Table 3 lists the constant volume sampling results for the harmful substances during this test.

TABLE 3

| Catalyst | | Constant volume sampling results of the European motorcycle cycle | | | |
|---|---|---|---|---|---|
| | | Constant volume sampling results | | | |
| | | CO | THC3*) | NOx | $CO_2$ |
| A | g/test | 7.008 | 2.990 | 1.111 | 1764.865 |
| | g/km | 0.549 | 0.234 | 0.087 | 138.204 |
| B | g/test | 5.673 | 2.043 | 0.895 | 1751.660 |
| | g/km | 0.444 | 0.160 | 0.070 | 137.256 |

*)THC3: total hydrocarbon, calculated as C3

The results of Table 3 show that the inventive catalyst B, based on the comparative catalyst, has an emission of carbon monoxide reduced by 19%, an emission of THC3 reduced by 31% and an emission of nitrogen oxides reduced by 19%.

What is claimed is:

1. A catalyst for the cleaning of the exhaust gases of internal combustion engines, comprising a honeycomb composed of smooth and corrugated metal sheets with an entrance end face and an exit end face for the exhaust gases, the metal sheets being provided with holes to reduce their heat capacity and a catalyst material having been applied to the metal sheets, characterized in that the holes of the metal sheets are completely filled with catalyst material and the hole area of all holes together is 5 to 80% of the area of the metal sheets.

2. The catalyst as claimed in claim 1, characterized in that the holes have a round, elliptical, oval, square, rectangular, slot-shaped or polygonal cross section.

3. The catalyst as claimed in claim 2, characterized in that the holes have an area between 0.1 $mm^2$ to 25 $mm^2$.

4. The catalyst as claimed in claim 3, characterized in that the holes are positioned over the entire surface or over part of the surface of the metal sheets.

5. The catalyst as claimed in claim 1, characterized in that the smooth or the corrugated metal sheets or both metal sheets are formed from expanded metal, the expanded metal having a mesh length from node center to node center between 0.5 and 5 mm.

6. The catalyst as claimed in claim 5, characterized in that the elongation of the expanded metal is selected from the range between 5 and 80%.

7. The catalyst as claimed in claim 6, characterized in that the expanded metal has been rolled flat after its production.

8. The catalyst as claimed in claim 5, characterized in that the mesh of the expanded metal is positioned over the entire surface or over part of the surface of the expanded metal.

9. The catalyst as claimed in claim 1, characterized in that it has a loading with catalyst material in a concentration between 50 and 400 g/1 of volume of the honeycomb.

10. A method of using the catalyst as claimed in claim 1, the method comprising exposing the catalyst to exhaust gas from an internal combustion engine for exhaust gas cleaning of the internal combustion engine engines.

11. The method of using the catalyst as claimed in claim 10, characterized in that the catalyst is used as a starting catalyst or as an underfloor catalyst in motor vehicles.

12. The method of using the catalyst as claimed in claim 10, characterized in that the catalyst is used for exhaust gas cleaning of motorized bicycles or motorized water vehicles.

* * * * *